(12) United States Patent
Hinson et al.

(10) Patent No.: US 11,525,594 B1
(45) Date of Patent: Dec. 13, 2022

(54) AUTOMATED MANAGEMENT OF ELECTRICITY CONSUMPTION

(71) Applicant: NRG ENERGY, INC., Princeton, NJ (US)

(72) Inventors: Matthew C. Hinson, Houston, TX (US); Mark D. Parsons, Missouri City, TX (US); John Goodman, Houston, TX (US); Gary Norris, Kingwood, TX (US); Luke Martin, Houston, TX (US); David Clausen, Katy, TX (US); Adrian Samaniego, El Paso, TX (US)

(73) Assignee: NRG ENERGY, INC., Princeton, NJ (US)

( * ) Notice: Subject to any disclaimer, the term of this patent is extended or adjusted under 35 U.S.C. 154(b) by 43 days.

(21) Appl. No.: 17/350,343

(22) Filed: Jun. 17, 2021

(51) Int. Cl.
| | |
|---|---|
| *F24F 11/47* | (2018.01) |
| *F24F 11/48* | (2018.01) |
| *F24F 11/61* | (2018.01) |
| *F24F 11/64* | (2018.01) |
| *G05B 13/04* | (2006.01) |
| *G06Q 50/06* | (2012.01) |

(52) U.S. Cl.
CPC ............. *F24F 11/47* (2018.01); *F24F 11/48* (2018.01); *F24F 11/61* (2018.01); *F24F 11/64* (2018.01); *G05B 13/048* (2013.01); *G06Q 50/06* (2013.01)

(58) Field of Classification Search
CPC .. F24F 11/47; F24F 11/48; F24F 11/61; F24F 11/64; G05B 13/048; G06Q 50/06
See application file for complete search history.

(56) References Cited

U.S. PATENT DOCUMENTS

| | | | | |
|---|---|---|---|---|
| 5,544,036 | A * | 8/1996 | Brown, Jr. | H02J 13/00018 700/277 |
| 8,091,795 | B1 * | 1/2012 | McLellan | G05D 23/1923 236/94 |
| 8,943,836 | B2 * | 2/2015 | Rose | F01K 23/10 60/39.182 |
| 9,739,496 | B2 * | 8/2017 | Seem | F24F 11/30 |
| 10,580,094 | B1 * | 3/2020 | Haynold | G06Q 50/06 |
| 11,120,411 | B2 * | 9/2021 | Turney | G05B 13/048 |
| 11,416,955 | B2 * | 8/2022 | Elbsat | G06N 5/02 |
| 2013/0268126 | A1 * | 10/2013 | Iwami | F24F 11/30 700/276 |

(Continued)

*Primary Examiner* — Ramesh B Patel
(74) *Attorney, Agent, or Firm* — Madan Law PLLC; Jeffrey Streets; Leela Madan

(57) ABSTRACT

An electricity automation application may automate control over an HVAC system in a consumer's home or other building to reduce or eliminate electricity consumption during a high-price or high-demand time interval. The consumer may grant authorization for the application to control the HVAC system at appropriate timepoints while maintaining an inside air temperature that is between minimum and maximum temperature setpoints set by the consumer. The application models temperature gains and losses for the home or building as a function of inside and outside temperatures and HVAC operating status. If a high-price or high-demand time interval is predicted, the application may determine a timepoint to precool or preheat the home or building to reduce or eliminate electricity use during the duration of the high-price or high-demand time interval.

19 Claims, 5 Drawing Sheets

(56) References Cited

U.S. PATENT DOCUMENTS

| | | | | |
|---|---|---|---|---|
| 2015/0167999 A1* | 6/2015 | Seem | .................. | F24F 11/30 |
| | | | | 700/276 |
| 2017/0364105 A1* | 12/2017 | Greene | .............. | G05D 23/1904 |
| 2019/0093914 A1* | 3/2019 | Ristimäki | .............. | F24F 11/523 |
| 2019/0219293 A1* | 7/2019 | Wenzel | .................. | G06Q 50/06 |
| 2019/0353378 A1* | 11/2019 | Ramamurti | ............ | G05B 15/02 |
| 2020/0025402 A1* | 1/2020 | Bell | .................. | G05D 23/1923 |
| 2021/0296897 A1* | 9/2021 | Cruickshank, III | .... | H02J 3/381 |

* cited by examiner

AUTOMATED MANAGEMENT OF ELECTRICITY CONSUMPTION

BACKGROUND

The present disclosure relates to systems and methods for managing electricity consumption.

BACKGROUND OF THE RELATED ART

Electricity is delivered from producers to consumers over a distribution network referred to as an electric grid. A single electric grid may provide electricity to a large number of consumers. These consumers may include single family homes, apartments, businesses, schools and community buildings. For example, a typical home or apartment may include its own heating ventilation and cooling (HVAC) system, kitchen and laundry appliances, lighting systems, fans, audio and video equipment, computers, and many more electricity consuming devices. In order to monitor the amount of electricity used by each consumer, an electricity meter may be installed between the electric grid and the consumer's home, apartment or other structure. Accordingly, an electricity service provider may charge each individual consumer in accordance with their own electricity consumption.

Retail electricity providers (REPs), also known as suppliers in some markets, commonly offer programs that incentivize electricity consumers to reduce or shift their electricity load during times when the electric grid is experiencing high demand or when supply is constrained. Electric grid operators, including transmission and distribution service providers (TDSPs), provide incentives to the REP, which may be passed on to the consumer for their part in reducing grid demand. Another incentive for the REP to reduce the load of their customers is the financial risk to the REP associated with the load of their customers. REPs estimate the sum of their customers' electricity demand and purchase that load in advance to lock in a cost for the electricity delivered to their customers. If a REP's customer base, in aggregate, demands more electricity load than the REP has purchased for any given time interval, the REP is exposed to the real-time wholesale spot market price of electricity, which can be exorbitant when demand approaches the limits of the grid's current electricity supply. Because of this exposure to real-time wholesale prices, REPs have an incentive to encourage their customers to reduce load. Because their customers typically pay a fixed rate per kWh, the REP may develop an incentive for their customers to reduce load by, for example, adjusting their home thermostat or stopping the use of other electricity consuming devices. If the customer has electricity power storage or generation devices, the REP may incentivize them to use those devices to provide the electricity to offset their electricity needs that would otherwise come from the grid.

Because the total demand for electricity on the electric grid typically determines the real-time wholesale price of electricity charged to the REP, both price and demand can play a role in managing load. There are times when electricity supply on the grid is not causing an increase in prices, but the REP may find they have not pre-purchased enough load for their customers' needs, and thus the REP may be exposed to wholesale market prices they would prefer to avoid. Use of the term "price," when referring to the wholesale electricity spot markets, may indicate an overall grid supply strain or may indicate a REP's management of its financial risk exposure. The amount of supply and demand on the electric grid is typically managed by a grid operator, typically overseen by a public utility commission (PUC). The grid operators typically share real-time data with retail electric providers and suppliers, and, often, with the public via web sites, portals, or application programming interfaces (APIs). There are times when the grid operators communicate with REPs and suppliers to explicitly incentivize actions to reduce the load on the grid. However, REPs may have other incentives that drive them to offer their own customers incentives to reduce load on the grid, even if the grid operators are not communicating an urgent request for action.

BRIEF SUMMARY

Some embodiments provide a computer program product comprising a non-volatile computer readable medium and non-transitory program instructions embodied therein, the program instructions being configured to be executable by a processor to cause the processor to perform operations. The operations may include identifying a first time interval during a first time period at which a predicted price for electricity on an electric grid is greater than a high-price setpoint or a predicted demand for electricity on the electric grid is greater than a high-demand setpoint. The operations may further include determining, for a thermostat in an air conditioning system for controlling an inside air temperature within a building, a first precooling initiation timepoint prior to a beginning of the identified first time interval by predicting the inside air temperature at the beginning of the identified first time interval, determining a first precooling time period required for the air conditioning system to cool the inside air of the building from the predicted inside air temperature to a minimum inside air temperature setpoint, and calculating the first precooling initiation timepoint by subtracting the first precooling time period from the beginning of the identified first time interval. Still further, the operations may include causing an inside air temperature setpoint for the thermostat to be set equal to the minimum inside air temperature at the first precooling initiation timepoint.

DETAILED DESCRIPTION

Figure 1:
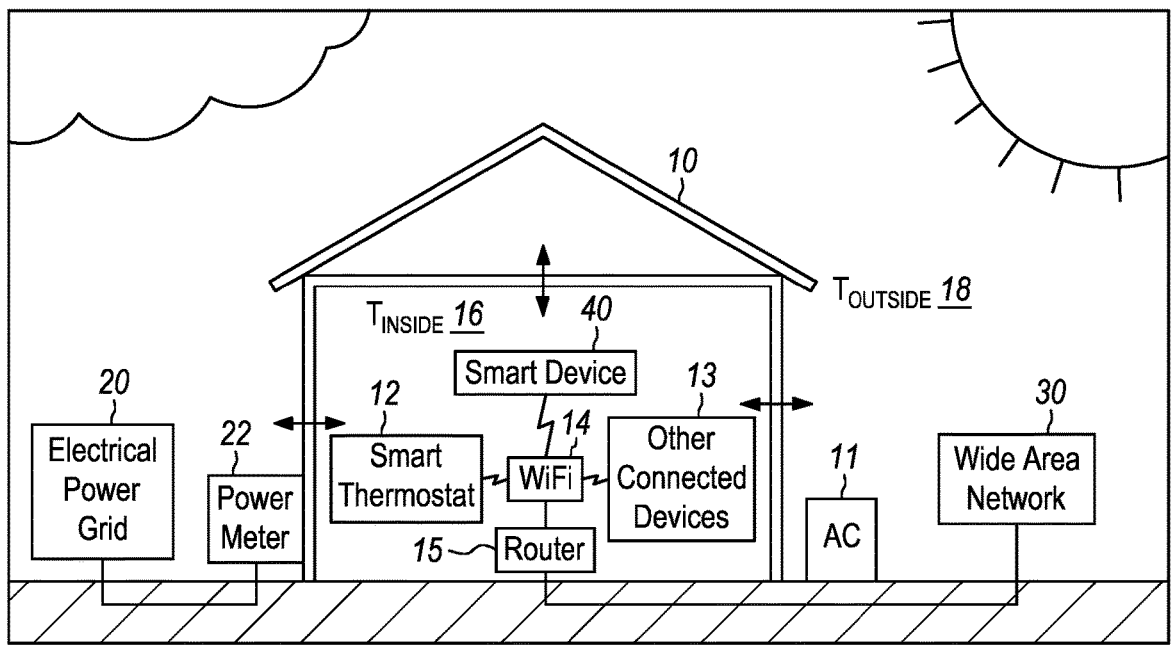
FIG. 1 is a schematic diagram of a consumer's home that receives electricity from the electric grid and has a connection to a wide area network.

Some embodiments provide a computer program product comprising a non-volatile computer readable medium and non-transitory program instructions embodied therein, the program instructions being configured to be executable by a processor to cause the processor to perform various operations. The operations may include identifying a first time interval during a first time period at which a predicted price for electricity on an electric grid is greater than a high-price setpoint or a predicted demand for electricity on the electric grid is greater than a high-demand setpoint. The operations may further include determining, for a thermostat in an air conditioning system for controlling an inside air temperature within a building receiving electricity from the electric grid, a first precooling initiation timepoint prior to a beginning of the identified first time interval by predicting the inside air temperature at the beginning of the identified first time interval, determining a first precooling time period required for the air conditioning system to cool the inside air of the building from the predicted inside air temperature to a minimum inside air temperature setpoint, and calculating the first precooling initiation timepoint by subtracting the first precooling time period from the beginning of the identified first time interval. Still further, the operations may include causing an inside air temperature setpoint for the thermostat to be set equal to the minimum inside air temperature at the first precooling initiation timepoint.

In some embodiments, the operations may further include causing the inside air temperature setpoint for the thermostat to be set equal to a maximum inside air temperature at the beginning of the identified first time interval.

In some embodiments, the operations may further include causing the inside air temperature setpoint for the thermostat to return to a pre-programmed value at the end of the identified first time interval.

In some embodiments, the operations may further include causing the inside air temperature setpoint for the thermostat to be set equal to the maximum inside air temperature in response to the actual current price of electricity being greater than the high-price setpoint at any point during the first time period, and causing the inside air temperature setpoint for the thermostat to return to a pre-programmed value in response to the actual current price of electricity being less than the high-price setpoint and the current time is not between the precooling initiation timepoint and the beginning of the identified first time interval.

In some embodiments, the operations may further include obtaining, prior to the first time period, a first predicted price for electricity on the electric grid available to the air conditioning system during each of a plurality of time intervals throughout the first time period. In one option, the inside air temperature setpoint for the thermostat is caused to be set equal to the minimum inside air temperature at the precooling initiation timepoint by sending a message to the thermostat, wherein the message instructs the thermostat to set the inside air temperature setpoint to a value equal to the minimum inside air temperature. In a further option, the message to the thermostat may be queued, wherein the message is taken from the queue and sent to the thermostat in response to a current time reaching the precooling initiation timepoint and the message remaining in the queue.

In some embodiments, the operations may further include obtaining, within a predetermined amount of time prior to a beginning of each of the plurality of time intervals throughout the first time period, an updated predicted price for electricity on the electric grid available to the air conditioning system during the time interval, and removing the message from the queue in response to the updated price for electricity on the electric grid during the identified first time interval being less than the high-price setpoint for the thermostat.

In some embodiments, the operations may further include obtaining, within a predetermined amount of time prior to a beginning of each of the plurality of time intervals throughout the first time period, an updated predicted price for electricity on the electric grid available to the air conditioning system during the time interval, and leaving the message in the queue in response to the updated price for electricity during the identified first time interval being greater than the high-price setpoint for the thermostat.

In some embodiments, the operations may further include obtaining, within a predetermined amount of time prior to a beginning of each of the plurality of time intervals throughout the first time period, an updated predicted price for electricity on the electric grid available to the air conditioning system during the time interval, and identifying a second time interval among the plurality of time intervals during the first time period at which the updated predicted price for electricity on the electric grid is greater than the high-price setpoint for the thermostat, wherein the predicted price for electricity on the electric grid during the second time interval is less than the high-price setpoint for the thermostat. The operations may further include determining a second precooling initiation timepoint prior to a beginning of the identified second time interval by: predicting the inside air temperature at the beginning of the identified second time interval, determining a second precooling time period required for the air conditioning system to cool the inside air of the building from the predicted inside air temperature at the beginning of the identified second time interval to the minimum inside air temperature setpoint, and calculating the second precooling initiation timepoint by subtracting the second precooling time period from the beginning of the identified second time interval. Sill further, the operations may include causing the inside air temperature setpoint for the thermostat to be set equal to the minimum inside air temperature at the second precooling initiation timepoint.

In some embodiments, the predicted price for electricity on the electric grid available to the air conditioning system during each of the plurality of time intervals throughout the first time period are obtained from a third-party application server over a wide area network.

In some embodiments, the operation of predicting the inside air temperature at the beginning of the identified first time interval includes identifying an inside air temperature setpoint that the thermostat has been set to apply at the beginning of the identified first time interval and predicting that the inside air temperature at the beginning of the identified first time interval will be equal to the inside air temperature setpoint at the beginning of the identified first time interval.

In some embodiments, the operations may further include adding a time buffer to the calculated first precooling time period before calculating the first precooling initiation timepoint In some embodiments, the operation of determining a first precooling time period required for the air conditioning system to cool the inside air of the building from the predicted inside air temperature to a minimum inside air temperature setpoint includes: calculating a temperature differential between a forecast outside air temperature for a location of the building at the beginning of the identified first time interval and the predicted inside air temperature at the beginning of the identified first time interval; obtaining a predetermined rate of decrease of the inside air temperature of the building with the air conditioning system turned on for cooling the air inside the building, wherein the predetermined rate of decrease of the inside air temperature is stored as a function of the temperature differential; calculating a precooling temperature change as the difference between the predicted inside air temperature at the beginning of the identified first time interval and the minimum inside air temperature setpoint; and calculating the first precooling time period as the precooling temperature change divided by the predetermined rate of decrease of the inside air temperature that is associated with the calculated temperature differential.

In some embodiments, the operations may further include determining, for each of a plurality of increments in a temperature differential value between an inside air temperature of the building and an outside air temperature near the building, a rate of decrease of the inside air temperature of the building with the air conditioning system actively cooling the inside air. The operations may then further include storing, for each of the plurality of increments in the temperature differential value, the temperature differential value in association with the rate of decrease of the inside air temperature of the building with the air conditioning system actively cooling the inside air determined with the temperature differential value, and selecting the predetermined rate of decrease of the inside air temperature as the rate of decrease of the inside air temperature determined for a temperature differential that is the closest to the calculated temperature differential between the forecast outside air temperature for the location of the building at the beginning of the identified first time interval and the predicted inside air temperature at the beginning of the identified first time interval.

In some embodiments, the operation of determining, for each of a plurality of increments in a temperature differential value between an inside air temperature of the building and an outside air temperature near the building, a rate of decrease in an inside air temperature of the building with the air conditioning system actively cooling the inside air may further include periodically obtaining a cooling regain data set with the air conditioning system actively cooling the inside air, each cooling regain data set including a timestamp, the inside air temperature measurement for the building, and the outside air temperature measurement at a location near the building. The operation of determining a rate of decrease may still further include determining, for each cooling regain data set, a key-value pair including a key and a coefficient value associated with the key, wherein the key is an absolute value of a difference between the inside air temperature measurement and the outside air temperature measurement in the cooling regain data set, and wherein the coefficient value is a rate of change in the inside air temperature measurement between the input data set and a previous input data set over an amount of time between the timestamp for the cooling regain data set and a timestamp for the previous cooling regain data set. In one option, the operations may further include calculating, for each of a plurality of key-value pairs in the cooling regain data set having the same value of the key, an average of the coefficient values. In another option, the operations may further include rounding the value of the key to the nearest of a plurality of predetermined key values. For example, the plurality of predetermined values may form a series of temperature values that differ by a predetermined interval, such as half of one degree Fahrenheit.

Some embodiments provide an automation application or service that automates the management of electricity consumption at a consumer's building or facility, such as a residence, business, or other establishment. For example, the automation application may be implemented as a hosted Software as a Service (SAAS). The automation application may use Artificial Intelligence (AI) and/or Machine Learning (ML) to manage the operation of one or more connected devices at the consumer's facility. The automation application may use data such as electricity plan type, facility size, weather conditions, and the current cost of electricity to control the operation of any of the one or more connected devices. The automation application may temporarily control the operation of any of the one or more connected devices, such as the air conditioning system, to reduce electricity demand on the electric grid.

Some embodiments may manage electricity consumption during time periods in which the cost of electricity is high in order to reduce the total cost of electricity consumption by a REP. Some embodiments may manage electricity consumption during time periods in which the cost of electricity is high in order to lower the carbon footprint of a facility. Some embodiments may manage electricity consumption during time periods in which the cost of electricity is high in order to reduce the overall consumption of electricity use during peak hours of the day.

In some embodiments, the automation application may manage electricity consumption by shifting the operation of one or more devices from a first period of time having a high cost of electricity to a second period of time having a low cost of electricity. In one option, the first period of time may be characterized by peak electricity demand and the second period of time may be characterized by much lower electricity demand. Any of the one or more devices may be characterized as "high-usage devices" if the electricity consumption of the device has a substantial effect on the overall electricity consumption of the facility. Shifting operation of these high-usage devices from the first period of time having a high cost of electricity to a second period of time having a low cost of electricity results in a lower cost of electricity for the same amount of electricity consumption.

In some embodiments, the one or more electricity consuming devices at the consumer facility may include a heating, ventilation and air conditioning (HVAC) system, swimming pool pump, water heater, kitchen appliance, laundry appliance, electric vehicle charging station, battery system and any other electronics or automation systems. One non-limiting example of other electronics is a lighting system. Non-limiting examples of automation systems may include a robo-vacuum, garden and law irrigation systems, and automated window blinds.

Each of these one or more electricity consuming devices may include a local controller. The local controller may be a shared or dedicated controller, an integrated or stand-alone controller, and/or a general-purpose or special-purpose controller. Furthermore, the controller may include a processor that executes software or firmware, or the controller may be an analog controller or other set of hardware components. In one specific example, a controller for an HVAC system may be referred to as a thermostat, and such thermostat is typically a stand-alone, special-purpose controller. A modern smart thermostat may run software and/or firmware that can be periodically updated to provide additional functionality. Many of the one or more devices may be referred to as a "smart" device if at least some aspect of their operation is controlled by a microprocessor. A microprocessor includes a broad range of devices that execute software and/or firmware, including a central processing unit (CPU) of a general-purpose computer and an application-specific integrated circuit (ASIC).

In some embodiments, the one or more devices may include a controller coupled to a wired or wireless communication interface that may receive communications from an application server or cloud computer for management of electricity consumption by the one or more devices. Non-limiting examples of a communication interface include wireless mobile telecommunications, wireless satellite communications, Ethernet, WiFi, Bluetooth, or other interfaces supporting special-purpose or proprietary communication specifications or standards. Some embodiments may enable the one or more devices to access the Internet, either directly or indirectly through one or more other devices, networks, and/or communication interfaces. For example, a smart thermostat may have a WiFi interface that allows the thermostat to access the Internet over a wireless local area network coupled to a router that communicates with an Internet Service Provider (ISP).

In some embodiments, the one or more devices may be in periodic communication with a service provider that provides an application programming interface (API). A non-limiting example of one of the devices is a smart thermostat, although similar arrangements may exist for any one or more other devices. For example, a consumer may grant a service provider permission to directly access their smart thermostat, and the service provider may provide an API that may be used to provide an http-based interface for control and access to a particular smart thermostat. An integrator, such as the electrical power automation service provided by various embodiments, may be allowed to read, update and poll information about the particular smart thermostat using the API. Of course, the integrator must be authorized to access and/or control the smart thermostat by the consumer that owns or already has authorization to control the smart thermostat. Optionally, the API may be based on extensions to the OAuth 2.0 framework. Using this framework, a user may authorize the integrator to read and/or control the thermostat and/or other devices registered to the user's account with the service provider. It should be recognized that other connected devices in a consumer's facility may be similarly connected to a service provider and a similar authorization framework may be used to grant the integrator access to read and/or control the connected device. Therefore, embodiments of the electrical power automation application described herein may be able to read and/or control a wide variety of connected devices within the consumer's facility whether or not the integrator interfaces directly with one or more of the connected devices or must interface with a third-party service provider to gain access to one or more of the connected devices.

Learn, Predict, Recommend, and Run

In some embodiments, the automation application may be described in reference to four functions to automate the management of an electricity consuming device, such as a smart thermostat. Those four functions include: Learn, Predict, Recommend, and Run. Each of these four functions will be described below in the context of a smart thermostat, but similar automation may be accomplished for other electrical consuming devices using the same four functions.

Learn: After a consumer has connected their smart thermostat or other device and granted access and/or control authorization to the automation application, the automation application may periodically read the inside air temperature measured by the device and the operating status of the HVAC system. The current and/or forecast outside air temperature may be obtained from a third-party weather service.

The collected data is used by the automation application to calculate a set of values that represent the rate of temperature change that a home or other building experiences at specific temperature differences between outside air temperature and the inside air temperature while the HVAC system is not running. This set of values are referred to as "loss coefficients." The automation application also periodically reads the inside air temperature the HVAC is running and how the inside temperature of the home regains its preferred temperature vs outside temperature. This set of values are the "regain coefficient."

Over time, the automation application may build and aggregate coefficients for many degree differences to be used to create predictions on how a home will behave in the future with forecasted weather conditions. The automation application may refine the coefficients over time to increase the accuracy of the predictions and recommendations.

Predict: After collecting data about the thermal dynamics of the HVAC system and the building being cooled by the HVAC system, the automation application may predict the operation of the HVAC system over a prediction time period, such as a 24-hour period. The predicted operation of the HVAC system may later be compared to the actual operation of the HVAC system to determine the accuracy of the prediction and modify the manner of predicting the operation of the HVAC system to become more accurate. With the ability to make accurate predictions, the automation application may make recommendations that will be more cost-efficient than the predicted operation without automation.

Recommend: For each prediction time period, the automation application may create one or more recommendations for the consumer. The recommendations may be based on the predicting HVAC operating data and the forecasted electricity pricing data to define a HVAC runtime pattern that will result in reduced electricity consumption on the electric grid. The recommendations, if implemented, may or may not reduce the total amount of electricity consumed by the consumer. Rather, the focus of the recommendation is to reduce electricity consumption by the consumer during high-price time intervals in order to reduce or eliminate the amount of additional electricity that the REP must purchase during a high-price time interval. The recommendations may include pre-cooling or pre-heating a home in order to "coast" (i.e., let the inside air temperature fluctuate without using the HVAC system) through some or all of a predicted high-cost time period.

Run: Recommendations are sent to a designated smart device or account associated with the consumer. If the consumer has enabled full automation, then the automation application will provide an instruction to implement or run the recommendations. The automation application may also analyze past recommendations to determine whether the recommendations resulted in reduced electricity consumption by the consumer during a given high-price time interval. Analysis of the accuracy of past recommendations may enable the automation application to improve the algorithms over time.

Some embodiments provide an electricity automation application that can provide personalized control of each consumer's HVAC system. For a consumer that has granted permission to the automation application, the automation application may make periodic updates throughout the day to change one or more setting of the consumer's air conditioning system or HVAC system so that the system will reduce or eliminate operation during a high-price time interval. Specifically, the automation application may provide instructions to an individual system, where the number of instructions to the system may vary based on the consumer's individually set controls (high temperature setpoint and low temperature setpoint), home efficiency, and the outside air temperature. The remote automation application may periodically poll the consumer's local system, such as every 10 or 15 minutes, in order to obtain a current inside air temperature measurement from the system.

Some embodiments provide a computer program product comprising a non-volatile computer readable medium and non-transitory program instructions embodied therein, the program instructions being configured to be executable by a processor to cause the processor to perform operations. The operations include determining, for each of a plurality of increments in a temperature differential between an inside air temperature of a building and an outside air temperature near the building, a rate of decrease in an inside air temperature of a building with an air conditioning system actively cooling the air in the building and a rate of increase in the inside air temperature of the building with the air conditioning system not actively cooling the air in the building. The operations further include obtaining a high inside air temperature setpoint and a low inside air temperature setpoint for the air conditioning system for the building, obtaining an initial inside air temperature and an initial outside air temperature for a beginning timepoint at a beginning of a prediction time period, obtaining a forecast of the outside air temperature for a plurality of timepoints over the prediction time period, and predicting an inside air temperature for each of the plurality of timepoints. The operations still further include obtaining predicted prices for electricity on the electric grid available to the air conditioning system as a function of time over the prediction time period, and identifying a high-price time interval during the prediction time period where the predicted price for electricity exceeds a high-price setpoint. In addition, the operations include communicating with a controller for the air conditioning system prior to a beginning of the identified high-price time interval to instruct the controller to cause the air conditioning system to begin cooling the air inside the building prior to the beginning of the high-price time interval even if the inside air temperature is less than the high temperature setpoint, and communicating with the controller for the air conditioning system to instruct the controller to cause the air conditioning system to not cool air inside the building during the predicted period of high price unless the inside air temperature exceeds the high temperature setpoint. In one example, the controller for the air conditioning system may be a smart thermostat.

In some embodiments, the operation of predicting an inside air temperature for each of the plurality of timepoints may include certain calculating operations. One such operation includes calculating, for a first timepoint of the prediction time period, a predicted inside air temperature based on the obtained inside air temperature, a duration between the beginning timepoint and the first timepoint, and either (1) the determined rate of decrease in the inside air temperature for the temperature differential increment closest to a difference between the obtained inside air temperature and the obtained outside air temperature in response to the obtained inside air temperature being above the high inside air temperature setpoint, or (2) the determined rate of increase in the inside air temperature for the temperature differential increment closest to a difference between the obtained inside air temperature and the obtained outside air temperature in response to the obtained inside air temperature being less than the high inside air temperature setpoint. Another such operation includes calculating, in chronological order for each timepoint of the prediction time period after the first timepoint, a predicted inside air temperature for the timepoint based on the predicted inside air temperature for the previous timepoint, a duration between the timepoint and the previous timepoint, and either (1) the determined rate of decrease in the inside air temperature for the temperature differential increment closest to a difference between the predicted inside air temperature for the previous timepoint and the outside air temperature forecast for the previous timepoint in response to the predicted inside air temperature for the previous timepoint being above the high inside air temperature setpoint, or (2) the determined rate of increase in the inside air temperature for the temperature differential increment closest to a difference between the predicted inside air temperature for the previous timepoint and the outside air temperature forecast for the previous timepoint in response to the predicted inside air temperature for the previous timepoint being less than the high inside air temperature setpoint.

In some embodiments, the operations further include determining a precooling beginning timepoint prior to the high-price time interval at which to begin cooling the air inside the building. Accordingly, the operation of communicating with the controller for the air conditioning system prior to a beginning of the identified high-price time interval includes sending a first message to the controller for the air conditioning system at the determined precooling beginning timepoint to instruct the controller to cause the air conditioning system to begin precooling. In one option, the operation of communicating with the controller for the air conditioning system to instruct the controller to cause the air conditioning system to not cool air inside the building during the predicted high-price time interval unless the inside air temperature exceeds the high temperature setpoint includes sending a second message to the controller for the air conditioning system at the beginning of the high-price time interval.

In some embodiments, the operations further include determining a precooling beginning timepoint prior to the high-price time interval at which to begin cooling the air inside the building, wherein communicating with the air conditioning system prior to a beginning of the identified high-price time interval includes sending a message that identifies the determined precooling beginning timepoint. Accordingly, the message may be sent and received at any point prior to the beginning timepoint to cause the precooling to begin at the precooling beginning timepoint.

In some embodiments, the operations further include determining, for each of a plurality of increments in a temperature differential between an inside air temperature of a building and an outside air temperature near the building, a rate of decrease in an inside air temperature of a building with an air conditioning system actively cooling the air in the building and a rate of increase in the inside air temperature of the building with the air conditioning system not actively cooling the air in the building. The rate of decrease is also referred to herein as a cooling regain coefficient. Similarly, the rate of increase is also referred to herein as a cooling loss coefficient. Furthermore, the operation of predicting an inside air temperature for each of the plurality of timepoints may include applying the rate of decrease in the inside air temperature for any of the timepoints where the predicted inside air temperature for a previous timepoint is greater than the high air temperature setpoint (such that the air conditioning system should be actively cooling) and applying the rate of increase in the inside air temperature for any of the timepoints where the predicted inside air temperature for a previous timepoint is less than the high air temperature setpoint (such that the air conditioning system should be inactive or off).

In some embodiments, the operation of determining, for each of a plurality of increments in a temperature differential between an inside air temperature of a building and an outside air temperature near the building, a rate of decrease in an inside air temperature of a building with an air conditioning system actively cooling the air in the building and a rate of increase in the inside air temperature of the building with the air conditioning system not actively cooling the air in the building includes further operations. The further operations may include periodically obtaining an input data set, each input data set including a timestamp, an inside air temperature measurement for a building, an outside air temperature measurement at a location near the building, an operating mode of the air conditioning system that functions to control the inside air temperature for the building, and an operating status of the air conditioning system, wherein the operating mode is selected from heating and cooling, and wherein the operating status is selected from active and inactive. The further operations may also include determining, for each input data set, a key-value pair including a key and a coefficient value associated with the key, wherein the key is an absolute value of a difference between the inside air temperature measurement and the outside air temperature measurement in the input data set, and wherein the coefficient value is a rate of change in the inside air temperature measurement between the input data set and a previous input data set over an amount of time between the timestamp for the input data set and a timestamp for the previous input data set. The further operations may additionally include assigning, for each key-value pair, the key-value pair to a heating regain data set in response to the key-value pair identifying that the operating mode is heating and the operating status as active, a heating loss data set in response to the key-value pair identifying that the operating mode is heating and the operating status is inactive, a cooling regain data set in response to the key-value pair identifying that the operating mode is cooling and the operating status is active, or a cooling loss data set in response to the key-value pair identifying that the operating mode is cooling and the operating status is inactive.

In some embodiments, the operations may further include obtaining an initial operating mode and status for the beginning timepoint and forming, for a first timepoint of the prediction time period, a prediction data set including a predicted inside air temperature and a predicted operating mode and status. The operation of forming the prediction set may include selecting the heating regain data set in response to an operating mode of heating, an operating status of active, and the forecasted outside air temperature being less than the inside air temperature, selecting the heating loss data set in response to an operating status of off and the forecasted outside air temperature being less than the inside air temperature, selecting the cooling regain data set in response to an operating mode of cooling, an operating status of active, and the forecasted outside air temperature being greater than the inside air temperature, and selecting the cooling loss data set in response to an operating status of off and the forecasted outside air temperature being greater than the inside air temperature. The operation of forming the prediction set may further include identifying, within the selected data set, a key-value pair having a key that is closest in value to an absolute value of a difference between the inside air temperature measurement for the first timepoint and the forecasted outside air temperature for the first timepoint, and calculating a predicted temperature change in the inside air temperature by multiplying the coefficient value in the identified key-value pair by an amount of time between the first timepoint of the prediction period and the timepoint prior to the prediction period. The operation of forming the prediction set may also include calculating a predicted inside air temperature for the first timepoint by subtracting the predicted temperature change from the inside air temperature measurement obtained for the timepoint prior to the prediction time period in response to the selected data set being either the cooling regain data set or the heating loss data set, or adding the predicted temperature change to the inside air temperature measurement obtained for the timepoint prior to the prediction time period in response to the selected data set being either the cooling loss data set or the heating regain data set. The operation of forming the prediction set may additionally include predicting the operating mode for the first timepoint to be heating in response to the forecast outside air temperature being less than the low inside air temperature setpoint, predicting the operating mode for the first timepoint to be cooling in response to the forecast outside air temperature being greater than the high inside air temperature setpoint, and predicting the operating status for the first timepoint to be on in response to the predicted inside air temperature being less than the low inside air temperature or greater than the high inside air temperature setpoint.

In some embodiments, the operations may further include forming, for each of the plurality of timepoints over the prediction time period subsequent to the first timepoint, a prediction data set including a predicted inside air temperature, a predicted operating mode, and a predicted operating status, wherein the prediction data set for each of the plurality of timepoints are formed in chronological order from the first timepoint of the prediction time period. The operation of forming the prediction set may include selecting the heating regain data set in response to the most recent previous timepoint having the predicted operating mode of heating, the predicted operating status of on, and the forecasted outside air temperature less than the predicted inside air temperature, selecting the heating loss data set in response to the most recent previous timepoint having the predicted status of off and the forecasted outside air temperature less than the predicted inside air temperature, selecting the cooling regain data set in response to the most recent previous timepoint having the predicted operating mode of cooling, the predicted operating status of on, and the forecasted outside air temperature greater than the inside air temperature, and selecting the cooling loss data set in response to the most recent previous timepoint having the predicted operating status of off and the forecasted outside air temperature being greater than the predicted inside air temperature. The operation of forming the prediction set may further include identifying, within the selected data set, a key-value pair having a key that is closest in value to an absolute value of a difference between the predicted inside air temperature for the most recent previous timepoint and the forecasted outside air temperature for the most recent previous timepoint, and calculating a predicted temperature change in the inside air temperature by multiply the coefficient value in the identified key-value pair by an amount of time between the timepoint and the most recent previous timepoint. The operation of forming the prediction set may also include calculating a predicted inside air temperature for the timepoint by subtracting the predicted temperature change from the predicted inside air temperature for the most recent previous timepoint in response to the selected data set being either the cooling regain data set or the heating loss data set, or adding the predicted temperature change to the predicted inside air temperature for the most recent previous timepoint in response to the selected data set being either the cooling loss data set or the heating regain data set. The operation of forming the prediction set may additionally include predicting the operating mode for the timepoint to be heating in response to the forecast outside air temperature for the timepoint being less than the low inside air temperature setpoint, predicting the operating mode for the timepoint to be cooling in response to the forecast outside air temperature for the timepoint being greater than the high inside air temperature setpoint, and predicting the operating status for the timepoint to be on in response to the predicted inside air temperature for the timepoint being less than the low inside air temperature or greater than the high inside air temperature setpoint.

In some embodiments, the operations may further include determining whether the predicted inside air temperature exceeds the high inside air temperature setpoint for any timepoint during the identified high-price time interval. In this embodiment, the operation of communicating with the air conditioning system prior to a beginning of the identified high-price time interval to instruct the air conditioning system to begin cooling the air inside the building prior to the beginning of the high-price time interval even if the inside air temperature is less than the high temperature setpoint is performed only in response to determining that the predicted inside air temperature exceeds the high inside air temperature setpoint for at least one timepoint during the identified high-price time interval. In other words, this embodiment only initiates precooling if the prediction shows that cooling would otherwise be necessary during the high-price time interval.

In some embodiments, the operations further include predicting a precooling beginning timepoint prior to the high-price time interval that would reduce the inside air temperature to a precooling target temperature prior to the high-price beginning timepoint, wherein communicating with the air conditioning system prior to a beginning of the identified high-price time interval includes sending a first message to the air conditioning system at the determined precooling beginning timepoint to instruct the air conditioning system to begin precooling.

In some embodiments, the operation of predicting a precooling beginning timepoint that would reduce the inside air temperature to the precooling target temperature prior to the high-price beginning timepoint may further include forming, for a plurality of timepoints prior to the high-price beginning timepoint, a second prediction data set including a second predicted inside air temperature. The second prediction data set for each of the plurality of timepoints is formed in reverse chronological order from the timepoint at the beginning of the high-price time interval until the second predicted inside air temperature reaches the precooling target temperature.

In some embodiments, the operation of forming the second prediction set for the timepoint immediately prior to the timepoint at the beginning of the high-price period may include further operations. The further operations may include identifying, within the cooling regain data set, a second key-value pair having a key that is closest in value to an absolute value of a difference between the predicted inside air temperature for the timepoint at the beginning of the high-price time interval and the forecasted outside air temperature for the timepoint at the beginning of the high-price time interval. The further operations may also include calculating a second predicted temperature change in the inside air temperature by multiply the coefficient value in the identified second key-value pair by an amount of time between the timepoint at the beginning of the high-price time interval and the most recent previous timepoint, and calculating a second predicted inside air temperature for the timepoint by subtracting the second predicted temperature change from the predicted inside air temperature for the timepoint at the beginning of the high-price time interval.

In some embodiments, the operation of forming the second prediction set for each timepoint immediately prior to another timepoint (i.e., in reverse chronological order) for which a second prediction set has been formed may include further operations that are repeated for a plurality of timepoints in reverse chronological order until the second predicted inside air temperature for the timepoint is less than or equal to the precooling target temperature. For example, the further operations may include: (i) identifying, within the cooling regain data set, a second key-value pair having a key that is closest in value to an absolute value of a difference between the second predicted inside air temperature for the immediately subsequent timepoint and the forecasted outside air temperature for the immediately subsequent timepoint; (ii) calculating a second predicted temperature change in the inside air temperature by multiply the coefficient value in the identified second key-value pair by an amount of time between the timepoint and the immediately subsequent timepoint; and (iii) calculating a second predicted inside air temperature for the immediately prior timepoint by subtracting the second predicted temperature change for the timepoint from the second predicted inside air temperature for the immediately subsequent timepoint. The foregoing steps (i) through (iii) may be repeated for a plurality of timepoints in reverse chronological order until the second predicted inside air temperature for the timepoint is less than or equal to the precooling target temperature. Accordingly, the precooling beginning timepoint is identified to be the timepoint at which the second predicted inside air temperature for the timepoint is less than or equal to the precooling target temperature. In one option, the precooling target temperature is the low temperature setpoint.

In some embodiments, the operations may further include forming, for each timepoint subsequent to the precooling beginning timepoint, a third prediction data set, wherein the third prediction data set for each of the timepoints subsequent to the precooling beginning timepoint are formed in chronological order from the first timepoint subsequent to the precooling beginning timepoint. Accordingly, the third prediction data set for each timepoint provides a prediction of the HVAC system operation over the prediction time period, including the precooling that occurs prior to the high-price time point.

In some embodiments, the operations further include establishing a default value of the high-price setpoint in the absence of a user-entered value for the high-price setpoint. The use of a default value and/or a value set by the automation application may reflect a reality that the entity hosting the automation application may have more knowledge and experience at determining a "high-price" setpoint (i.e., the price of electricity at which the consumer HVAC system should attempt to avoid consumption of electricity).

In some embodiments, the operation of obtaining predicted prices for electricity available to the air conditioning system as a function of time over the prediction time period includes the operation of accessing the predicted prices for electricity on the electric grid available to the air conditioning system as a function of time from a third-party service over a wide area network.

In some embodiments, the operations further include: calculating, for each key-value pair in the heating regain data set having the same value of the key, an average, median, or mode of the coefficient values; calculating, for each key-value pair in the heating loss data set having the same value of the key, an average, median, or mode of the coefficient values; calculating, for each key-value pair in the cooling regain data set having the same value of the key, an average, median, or mode of the coefficient values; and calculating, for each key-value pair in the cooling loss data set having the same value of the key, an average, median, or mode of the coefficient values. Accordingly, the coefficient values may be more accurate by reflecting the average, median or mode of a plurality of coefficient values measured at the same differential temperature.

In some embodiments, the operations further include rounding the calculated value of the key to the nearest of a plurality of predetermined key values. In one specific example, the plurality of predetermined key values form a series of temperature values that differ by half of one degree Fahrenheit. Of course, the plurality of predetermined key values may be established in various manner and may have various intervals either greater than or less than half of one degree.

In some embodiments, the timepoints may be set at uniform intervals over the prediction time period. In one specific example, the timepoints are set at 15 minutes intervals throughout the prediction time period.

In some embodiments, the operations further include determining a precooling beginning timepoint prior to the high-price time interval at which to begin cooling the air inside the building, wherein the precooling beginning timepoint is determined to require a minimum amount of precooling while also preventing the predicted inside air temperature from exceeding the high temperature setpoint during the high-price period. Accordingly, the operation of communicating with the air conditioning system prior to a beginning of the identified high-price time interval may include instructing the air conditioning system to begin precooling at the precooling beginning timepoint.

In some embodiments, the operations further include detecting that an actual current price of electricity is greater than the high-price setpoint and causing, in response to detecting that the actual current price of electricity is greater than the high-price setpoint, the air conditioning system to control the inside air temperature using the high temperature setpoint until the actual current price of electricity is less than the high-price setpoint. In this manner, if the actual current price of electricity increases suddenly and unexpectedly (i.e., was not identified in the predicted price for electricity over the prediction time period), then the air conditioning system will not consume electricity from the electric grid unless and until the inside air temperature reaches the high temperature setpoint.

The foregoing computer program products may further include program instructions for implementing or initiating any one or more aspects of the methods and operations described herein. Furthermore, the systems described herein may further process the program instructions to implement or initiate any one or more aspects of the operations described herein.

FIG. 1 is a schematic diagram of a consumer's home 10 that receives electricity through a power meter 22 from the electric grid 20 and has a connection to a wide area network 30. The home should be understood to be representative of other buildings or facilities, such as a business, school or community building. The home 10 may include and/or use a wide variety of appliances and other electricity consuming devices, including an air conditioning unit 11 or HVAC system. For purposes of automation, the home 10 specifically includes the air conditioning unit 11, which is controlled by the smart thermostat 12, and other connected devices 13. The term "connected devices" means that these devices include a smart controller and the capability to connect to a network. In this example, the smart thermostat 12 and the other connected devices 13 are in communication with a local area network (LAN) via a wireless connection to the wireless access point (WiFi) 14. The wireless access point 14 may be connected to a wide area network (WAN) 30 through a router 15.

A consumer may also have a smart device 40 that can connect to the WAN 30 through the wireless access point 14 and/or via an independent wireless mobile (cellular) network (not shown). Furthermore, the smart device 40 may also be able to connected to the smart thermostat and/or the other connected devices through either the local area network or a direct short range connection (i.e., a personal area network) using a protocol such as Bluetooth. The smart device 40 may, for example, be a smart phone, tablet computer, notebook computer, desktop computer, smart television or the like.

As illustrated, the home 10 has an inside air temperature 16 and the environment around the home 10 has an outside air temperature 18. The inside air temperature 16 is affected by the outside air temperature 18, heat transfer through the walls, roof and other structure of the home 10, the operation of some of the other connected devices 13, as well as the operation of the air conditioning unit 11.

Figure 2:
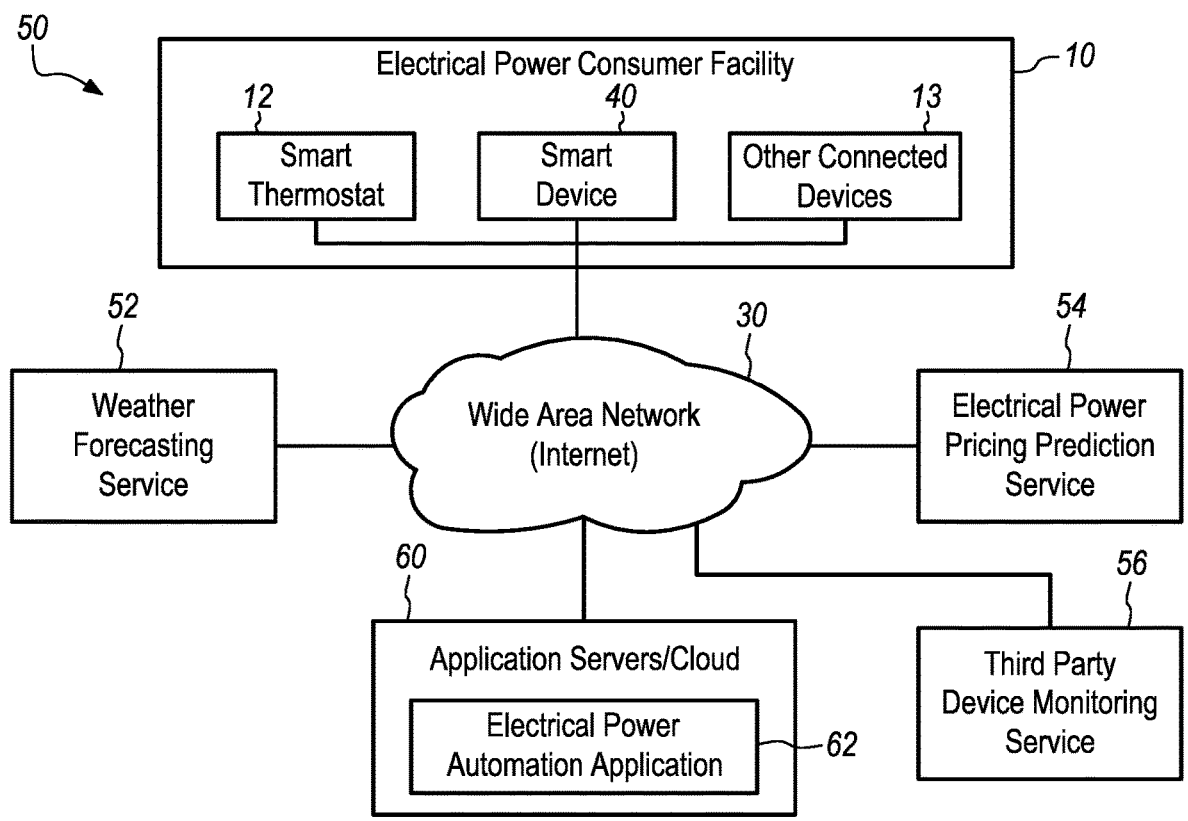
FIG. 2 is a block diagram of a system that may be used to provide electricity automation to a consumer's home or other building.

FIG. 2 is a block diagram of a system 50 that may be involved in electricity automation for a consumer's home or other building 10. In this illustration, the consumer's facility or home 10 includes the smart thermostat 12, a smart device 40, and other connected devices 13. Optionally, the consumer may use their smart device 40 to sign up for an electricity automation service. The smart device 40 may sign up for the service via a web browser application or an application ("app") downloaded from an app store. In one option, the consumer may receive some incentive, such as a lower fixed rate for electricity from their REP, to authorize the electricity automation service to control one or more of their devices, such as the thermostat.

The electricity automation service may be embodied in an electricity automation application 62 running on one or more application servers and/or a virtualized environment in the cloud 60. Accordingly, the smart device 40 may interact with the electricity automation application 62 over the wide area network (WAN) 30, such as the Internet. Using the smart device 40, the consumer may grant authorization for the electricity automation application 62 to access information from and/or control operation of the air conditioning system 11 via the smart thermostat 12. Optionally, the consumer may grant authorization for the application 62 to access information from and/or control operation of one or more of the other connected devices 13. The consumer may grant authorization to the application 62 for any one or more device and may select from various levels or types of automation. Specifically, the consumer may grant the application 62 authorization to access the inside air temperature measurements from the smart thermostat 12 and may also grant the application 62 authorization to control one or more functions of the smart thermostat 12, such as control over low/high temperature setpoints and/or other control settings. Optionally, the application 62 may be authorized to control activation of the air conditioning system by sending instructions to the smart thermostat 12. As described herein, the application 62 may instruct the smart thermostat 12 to precooling the air inside the home 10 at a precooling beginning timepoint and/or to not activate the air conditioning system during a high-price time interval.

In one option, the smart thermostat 12 may already be connected to and/or managed by a third part device monitoring service 56. In such a circumstance, the consumer may grant authorization for the electricity automation application 62 to interface with the smart thermostat via the consumer's account with the third-party device monitoring service 56. Specifically, the third-party device monitoring service 56 may provide an application programming interface (API) through which the electricity automation application 62 may access information from and/or send control instructions to the smart thermostat associated with the consumer's account.

To facilitate the application 62 preparing predictions and recommendations, the application 62 may communicate with a weather forecasting service 52 via the WAN 30 in order to receive a weather forecast. For example, the application 62 may obtain forecasted outside air temperatures for the location of the home 10 during a prediction time period, such as the next 24-hour period. Similarly, the application 63 may communicate with an electrical power pricing prediction service 54 via the WAN 30 in order to receive electrical power pricing predictions, such as next-day predicted pricing as a function of time.

Figure 3:
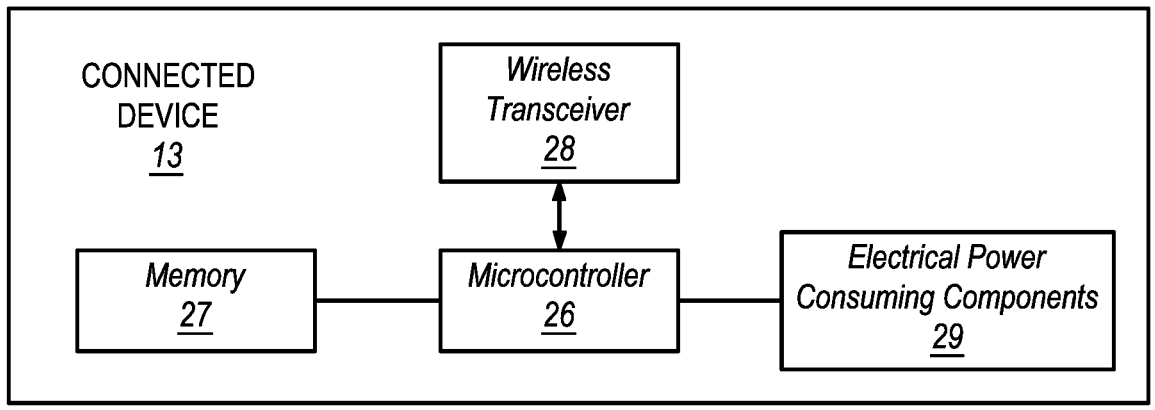
FIG. 3 is a diagram of a connected device that may receive control instructions in accordance with some embodiments.

FIG. 3 is a diagram of a connected device 13 that may receive control instructions in accordance with some embodiments. The connected device 13 includes a microcontroller or processor 26 in communication with an input/output interface or wireless transceiver 28 to gain access to the local area network. The microcontroller 26 is connected to memory 27, such as non-volatile memory and/or dynamic random-access memory (DRAM). The microcontroller 26 may also be connected to one or more electricity consuming components 29. The type of electricity consuming components 29 will vary depending on the type of device. For example, if the device 13 is a clothes dryer, then the electricity consuming components may include a local controller, a heating element and a motor.

Figure 4:
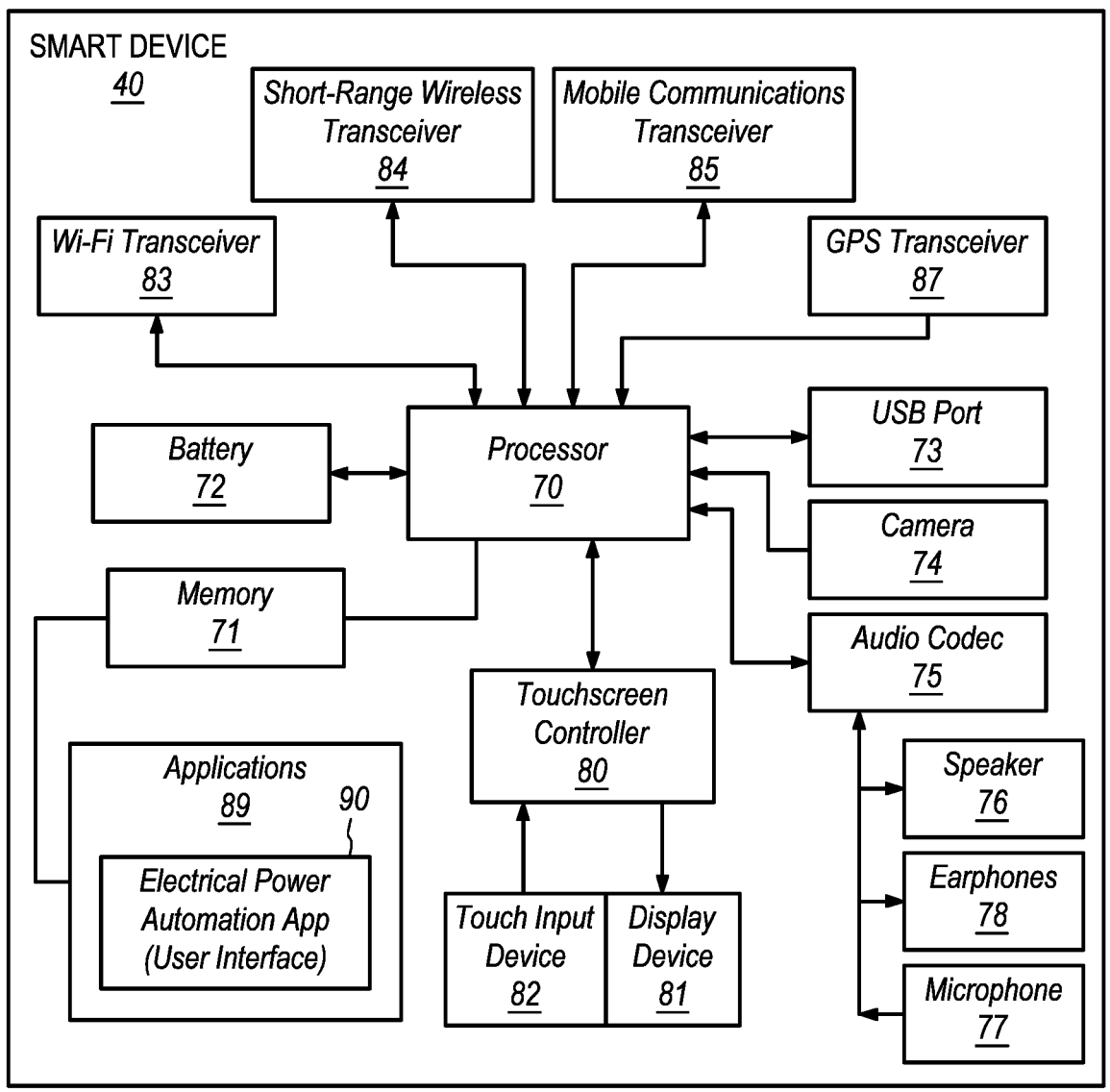
FIG. 4 is a diagram of a smart device that may provide a user interface enabling a consumer to setup and utilize the functionality of the electricity automation application.

FIG. 4 is a diagram of a smart device 40, such as a smartphone, that may provide a user interface enabling a consumer to setup and utilize the functionality of the electricity automation application. The smart device 40 may include a processor 70, memory or data storage device 71, a battery (or other power source) 72, a universal serial bus (USB) port 73, a camera 74, and an audio codec 75 coupled to a built-in speaker 76, a microphone 77, and an earphone jack 78. The second appliance 50 may further include a touchscreen controller 80 which provides a graphical output to the display device 81 and an input from a touch input device 82. Collectively, the display device 81 and touch input device 82 may be referred to as a touchscreen.

The smart device 40 may also include a short-range wireless transceiver 84, a wireless local area network transceiver ("Wi-Fi transceiver") 83, a mobile communication transceiver 85 for communication with a cellular communication network, and a global positioning system (GPS) transceiver 87. Accordingly, the Wi-Fi transceiver 83 enables the formation of a wireless local area network connection with the Wi-Fi box 29 of FIGS. 1 and 2.

The memory 71 may store one or more applications including program instructions that are executable by the processor 70. Such applications may include an operating system and applications that may generate an audible alert. Depending upon the task performed by the smart device 40, the memory 71 may include a device control program 79 including program instructions that may be executed by the processor 70 to cause the performance of various operations. The memory 71 may also store applications 89, such as an electricity automation app 90 that enables the consumer to interface with the electricity automation application 62 running on the application servers/cloud 60 (see FIG. 2).

Figure 5:
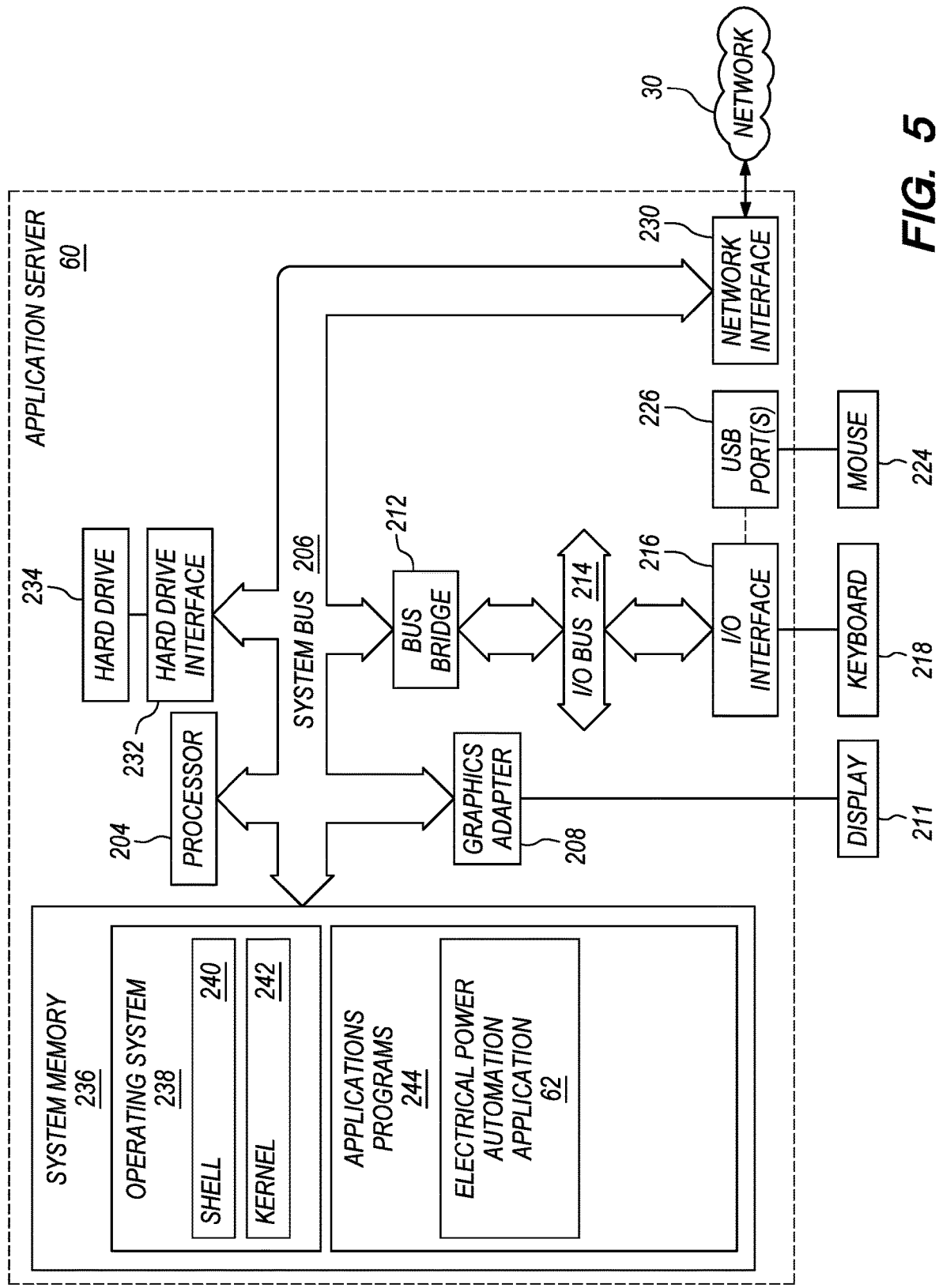
FIG. 5 is a diagram of an application server or cloud computer that may run the electricity automation application.

FIG. 5 is a diagram of an application server or cloud computer 60 that may run the electricity automation application 62. The server or computer 60 includes a processor unit 204 that is coupled to a system bus 206. The processor unit 204 may utilize one or more processors, each of which has one or more processor cores. A graphics adapter 208, which drives/supports the display 211, may also be coupled to the system bus 206. The graphics adapter 208 may, for example, include a graphics processing unit (GPU). The system bus 206 is coupled via a bus bridge 212 to an input/output (I/O) bus 214 and an I/O interface 216 is coupled to the I/O bus 214. The I/O interface 216 may facilitate communication with various I/O devices, such as a keyboard 218 (such as a touch screen virtual keyboard) and a USB mouse 224 via USB port(s) 226 (or other type of pointing device, such as a trackpad). As depicted, the computer 200 is able to communicate with other network devices over a network 250 using a network adapter or network interface controller 230. For example, in reference to FIG. 2, the server or computer 60 may communicate with one or more computers that run the weather forecasting service 52, the third-party monitoring service 56, the electrical power pricing prediction service 54, and the consumer's smart device 10 and/or smart thermostat 12 or other connected devices 13.

A hard drive interface 232 is also coupled to the system bus 206 and the hard drive interface 232 interfaces with a hard drive 234. In some embodiments, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and application programs 244. The hardware elements depicted in the computer 60 are not intended to be exhaustive, but rather are representative. For instance, the computer 60 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 60 includes application programs 244 in the system memory of the computer 60, including, without limitation, the electricity automation application 62.

Figure 6:
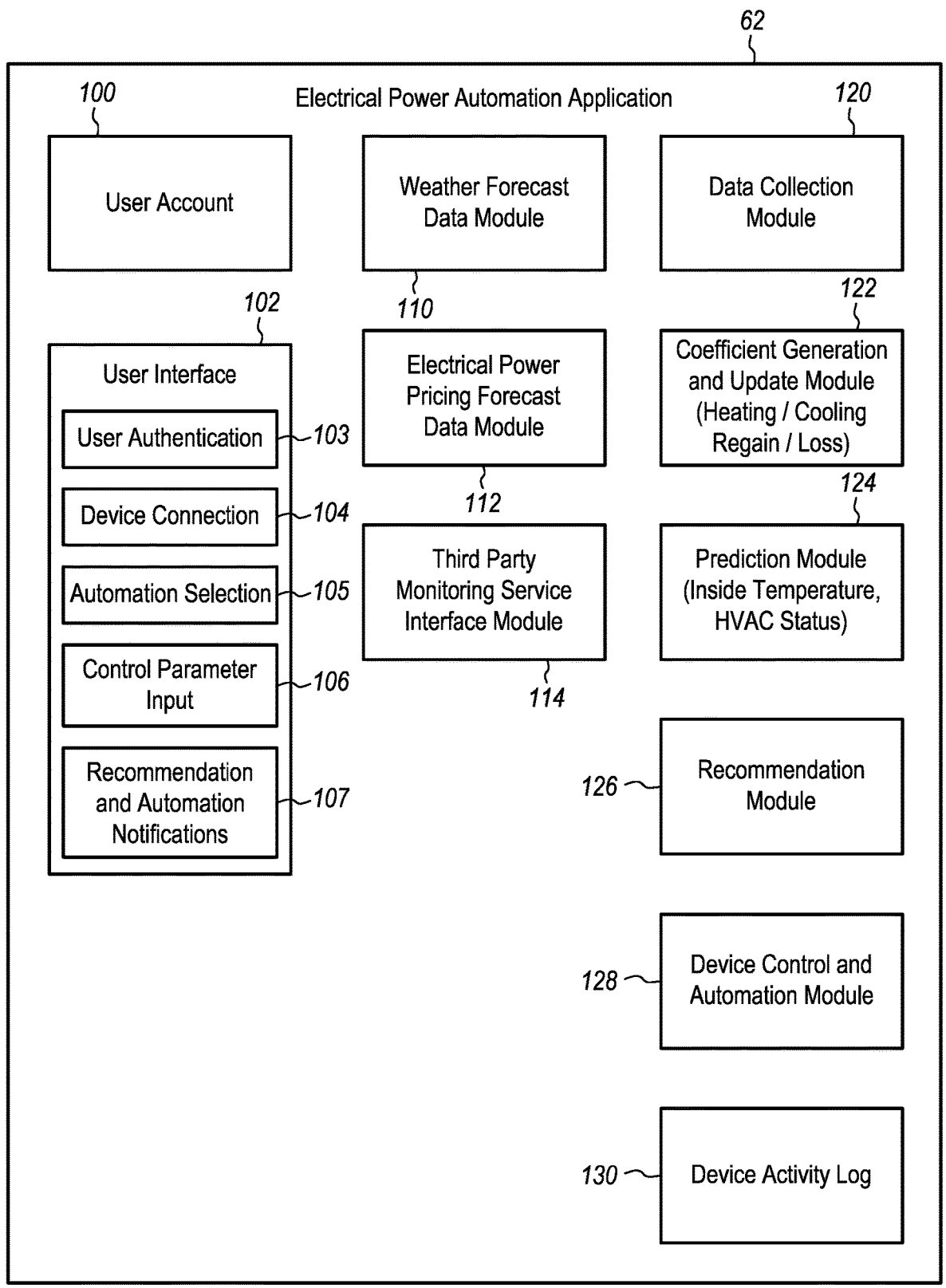
FIG. 6 is a diagram illustrating software modules of the electricity automation application in accordance with some embodiments.

FIG. 6 is a diagram illustrating software modules of the electricity automation application 62 in accordance with some embodiments. It should be recognized that the software module represents just one example of how the functionality of the application may be organized. More or fewer modules may be used for the purpose of implementing the operations of the automation described in any one or more embodiment.

In the left-hand column, the application 62 includes modules directed to the consumer (user). The center column includes modules directed to third-party services or sources of data. The right-hand column includes modules directed to the data collection, prediction, recommendation, and automation functions of the application 62.

The left-hand column includes a user account module 100 and a user interface module 102. The user interface module 102 further includes a user authentication module 103, a device connection module 104 for granting authorization to control a connected device, an automation selection module 105 for setting a level of automation, a control parameter input module 106 for input of inside air temperature setpoints, and a recommendation and automation notifications module 107 for establishing user-configurable push, text, and email notifications of real-time electricity consumption or automation activity and/or an activity time period summary.

The center column includes a weather forecast data module 110, an electricity power pricing forecast data model 112, and a third-party monitoring service interface module 114. These modules include the program instructions for obtaining data from the various services. One example of the electricity pricing forecast service is referred to as the Electrical Reliability Council of Texas (ERCOT), which provides real-time spot market projected and actual price signals.

The right-hand column includes a data collection module 120, a coefficient generation and update module 122, a prediction module 124 (i.e., inside temperature, HVAC status, etc.), a recommendation module 126, a device control and automation module 128, and a device activity log module 130. The device activity log may store all thermostat adjustment activity and will make this activity available to the user through the electricity automation app. For each consumer account, the electricity automation application will store their authentication information, control settings (including maximum and minimum inside air temperature setpoints), selected automation level, coefficients for the consumer's home or building (heating regain, heating loss, cooling regain, cooling loss), high-price setpoint, device activity log, prediction set data for the current prediction time period, etc.

In some embodiments, the data collection module 120 may include program instructions that cause the electricity automation application to collect data. Optionally, the data may be collected periodically throughout the prediction time period, such as every 10 or 15 minutes. Some of the data is obtained from the smart thermostat or other connected devices at the consumer's home or building. Other data may be obtained from third-party services, such as a weather forecasting service and/or an electric power pricing prediction service. For example, predicted and actual outside air temperature or other weather conditions may be obtained from a weather forecasting service. The data from a smart thermostat may include a current or recent inside air temperature measurement, the HVAC operating mode (heating/cooling) and status (active/inactive), and maximum and minimum inside air temperature setpoints. A timestamp at which the data was collected may be obtained from the smart thermostat or associated with the data when the electricity automation application has collected the data.

In some embodiments, the coefficient generation and update module 122 may include program instructions that cause the electricity automation application to use the inside and outside air temperature measurements, as well as the operating mode and status of the HVAC system, to generate coefficients that collectively represent the thermal efficiency of the home as well as the heating and cooling capacity of the HVAC system. Accordingly, the electricity automation application may determine a set of Cooling Regain Coefficients that are used to calculate the decrease in inside air temperature while the home's HVAC is actively cooling, a set of Cooling Loss Coefficients that are used to calculate the increase in inside temperature while the home's HVAC is off, a set of Heating Regain Coefficients used to calculate the increase in inside air temperature while the home's HVAC is actively heating, and a set of Heating Loss Coefficients used to calculate the decrease in inside air temperature while the home's HVAC is off. For each type of coefficient, key-value pairs are formed with a key and a value. The key is the difference between the outside temperature and the home's inside temperature, optionally rounded to the nearest half degree. The value is the calculated coefficient value (the absolute value of the temperature change per unit of time), which represents the increase or decrease of degrees per minute for the inside air temperature. The electricity automation application may then aggregate all of the temperature change records and assign each of the key-value pairs to the applicable category (i.e., heating/cooling and regain/loss coefficient records) using the operating mode and status parameters pulled from the temperature change records. As more and more records are created, a given category of coefficients may include multiple key-value pairs with the same key value. According, within a given category of coefficient, the multiple values having the same key value may be averaged to obtain a single coefficient value for use in predictions.

In some embodiments, the prediction module 124 may include program instructions that cause the electricity automation application to predict the inside air temperature and HVAC operating mode/status over a prediction time period. For example, a prediction set may be generated at timepoints separated by a uniform time interval, such as every 15 minutes. Predictions are built from initial measurements and readings from the smart thermostat and then extrapolated using the appropriate coefficients, predicted inside air temperatures and forecast outside air temperatures. A prediction set may be formed for each timepoint, with a subsequent prediction set being formed using both the predicted inside air temperature and predicted HVAC operating mode/status from the previous prediction set as well as the outside air temperature forecasted for the timepoint. The type of coefficient used at each timepoint may vary according to the HVAC operating mode/status.

In one option, the electricity automation application may determine whether the HVAC system is currently heating or cooling the home. If the HVAC system is heating then the application may assume there is a cold weather climate outside and if the HVAC system is cooling then the application may assume there is a hot weather climate outside. If the HVAC system is neither heating or cooling, then the application may look back from the previous hours of data to see if the home was heating or cooling in that time frame. If no heating or cooling events are obtained, then the application may simply assume that the HVAC was last heating if the current outside temperature is less than 65° F. and assume that the HVAC was last cooling if the current outside temperature is greater than 65° F. The application may then select the first coefficient type (heating or cooling) to use to begin the predictions and predict the inside temperature for the next 15 minutes. As the prediction iterates through each 15 minutes, the outside temperature may be checked to determine whether the climate outside is still the same or different for the purpose of selecting the appropriate type of coefficient. For example, the application may select a coefficient from the heating regain data set in response to an HVAC operating mode/status of "heating/on" and the forecasted climate type of cold outside weather, select a coefficient from the heating loss data set in response to an HVAC operating mode/status of "heating/off" and the current forecasted climate type of cold outside weather, select a coefficient from the cooling regain data set in response to an HVAC operating mode/status of "cooling/on" and the forecasted climate type of hot weather, and select a coefficient from the cooling loss data set in response to an HVAC operating mode/status of "cooling/off" and the forecasted climate type of hot weather.

In some embodiments, the recommendation module 126 may include program instructions that cause the electricity automation application to form recommendations using electric power pricing prediction data, such as the ERCOT next day forecasted energy pricing, to pin point any potential price spike. To find the beginning of a pre-high-cost period where the HVAC should begin precooling or preheating, the application uses the same process used in predictions except the calculations are performed in reverse chronological order from the timepoint when the higher price begins. If it is hot outside, the application may cause pre-cooling of the consumer's home down as low as the minimum temperature setpoint (targetHeat). For precooling, a cooling regain coefficient associated with an appropriate key value (for the current inside/outside temperature differential) is used and multiplied by the duration between timepoints. The resulting temperature change is then subtracted from the current predicted inside air temperature. This process is repeated until the predicted inside air temperature is equal to or less than the consumer's minimum temperature setpoint (targetHeat), and the corresponding timepoint is used as the beginning of our precooling time period.

In some embodiments, the device control and automation module 128 may include program instructions that cause the electricity automation application to take actions based on the recommendations. For example, if the consumer has granted authorization for the electricity automation application to control the operation of the HVAC system at their home, then an instruction is generated and sent to the smart thermostat to implement the recommendation. This may involve providing the instruction to a third-party device monitoring service using an application programming interface (API) that forwards the instruction to the smart thermostat.

The purpose of pre-cooling and pre-heating is to get the home's inside temperature fully leveraged to the limit of the user's preferred temperature settings in the opposite direction of the outside climate type (hot weather has the device pre-cool down, cold weather has the device preheat up). This will give the home the most runway to coast through the high-price time interval without running the HVAC. If the inside temperature reaches the consumer's maximum inside air temperature limit during a high-price time interval, then the HVAC system may be run in order to prevent the inside air temperature from exceeding that limit. However, by pre-cooling (or pre-heating) the electricity automation application reduces or eliminates the extent to which the HVAC system may need to run during the high-price time interval.

The electricity automation application may send individual instructions at approximately the timepoint that the instructions should be implemented. A polling job may be caused to look for actions that are scheduled to go out. When the polling job sees an action to send out at the current time, the polling job executes that action. For example, a pre-high cost action may be created to pre-cool a home at 11 AM. The polling job may see that action when the clock hits 11 AM and may send the instruction to initiate the pre-cooling.

Figure 7:
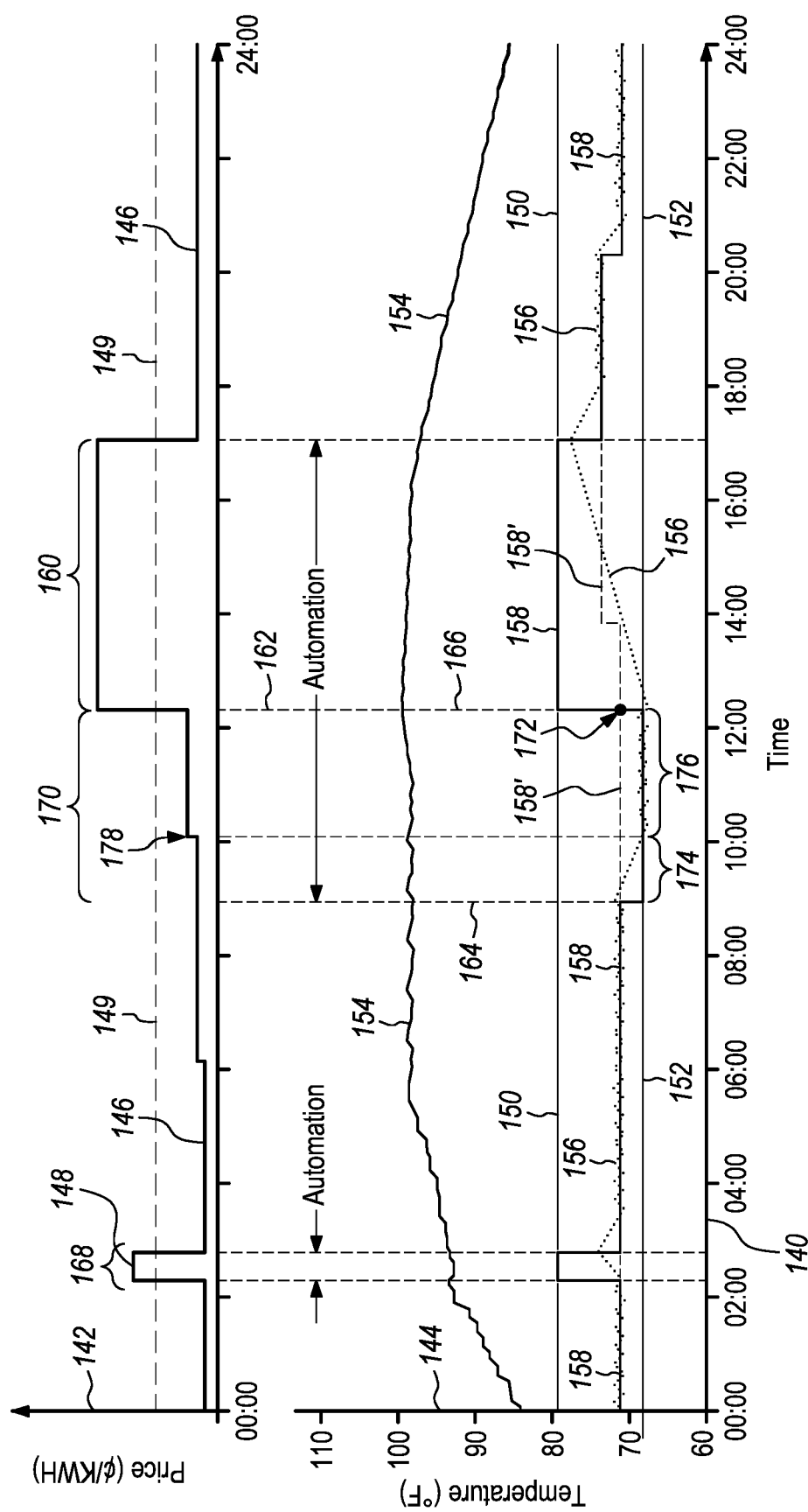
FIG. 7 is a graph illustrating how an electricity automation application according to some embodiments may automatically change a control setting of the HVAC system in response to a detected or predicted high price or high demand for electricity.

FIG. 7 includes a pair of graphs illustrating how an electricity automation application according to some embodiments may automatically change a control setting of the HVAC system in response to a detected or predicted high price for electricity. The two graphs are vertically-aligned and both graphs have the same horizontal axis (x-axis) 140 labeled in units of time (hours) over a 24-hour prediction period. The upper graph has a vertical axis (y-axis) 142 labeled in units of price for electricity (i.e., cents/kilowatt hour) and the lower graph has a vertical axis (y-axis) 144 labeled in units of temperature (i.e., degrees Fahrenheit). The actual values of the price are not provided because the relevant consideration in the upper graph is whether or not the predicted price 146 (or actual price 148) is greater than a high-price setpoint 149.

In reference to the lower graph of temperature versus time, a maximum (high) inside air temperature setpoint or limit 150 has been set at about 80° F. and a minimum (low) inside air temperature setpoint or limit 152 has been set at about 68° F. The lines representing these two setpoints extend horizontally across the entire graph for reference. The maximum and minimum inside air temperature setpoints or limits 150, 152 may be set by default or selected by a user as the highest and lowest temperature that the inside air temperature should ever be measured. These setpoints 150, 152 are distinct from, and should not be confused with, the current inside air temperature setpoint 158 that is used by a thermostat to control the inside air temperature at any point in time. In fact, the inside air temperature setpoint 158 may vary over time due to a manual change in the setpoint 158 to suit a user's current comfort needs, a programmed change in the setpoint 158 for routine comfort and/or energy management based on time of day and/or day of the week, or an automated change caused by the electricity automation application responsive to a high price period in accordance with one of the disclosed embodiments. However, the inside air temperature setpoint 158 should, under normal operating conditions, never be greater than the maximum (high) inside air temperature setpoint or limit 150 and never be less than the minimum (low) inside air temperature setpoint or limit 152.

An outside air temperature 154 in the environment around the consumer's home or other building is shown increasing toward the middle of the day, and the inside air temperature 156 (inside the home or other building) varies between the minimum inside air temperature setpoint 152 and the maximum inside air temperature setpoint 154 so long as the HVAC system is operating properly. In general, the operation of the HVAC system will cause the inside air temperature 156 to track the inside air temperature setpoint 158. For example, when there is no change in the setpoint 158, the inside air temperature 156 is shown rising slightly above the setpoint 158 as a result of the outside air temperature 154 being greater than the inside air temperature 156 and HVAC cycling off. Conversely, the inside air temperature 156 is shown dropping slightly below the setpoint 158 as a result of the HVAC cycling on and slowly reducing the inside air temperature 156. The amount to which the HVAC drives the inside air temperature 156 above and below the setpoint 158 may be dependent upon the design or setup of the thermostat controlling the HVAC system. However, when there is a step change in the value of the setpoint 158, the inside air temperature 156 will take some time to reach the new value of the setpoint 158. If the setpoint 158 steps up (increases), then there is a time period before the inside air will gain heat from outside and sources inside the building to reach the new, higher setpoint. If the setpoint 158 steps down (decreases), then there is a time period before the HVAC can cool the inside air to reach the new, lower setpoint.

Still further, the lower graph shows an inside air temperature setpoint 158 that is being applied by a smart thermostat within the home or other building to control the inside air temperature at any given point in time over the prediction time period shown. As illustrated, the smart thermostat controls the operation of the air conditioning system (or HVAC system) such that the inside air temperature 156 trends toward the air temperature setpoint 158. Changes in the air temperature setpoint 158 are typically step-changes, whereas the inside air temperature 156 gradually increases and decreases as affected by the outside air temperature 154, the thermal efficiency of the home or other building, the operating mode/status of the air conditioning system, and the maximum and minimum inside air temperature setpoints 150, 152.

The predicted price 146 for electric power (cents/kilowatt hour) may be obtained from an electric power pricing prediction service. The actual real-time price for electricity (cents/kilowatt hour) 148 (illustrated with a bold line) may be obtained from the same or different service. The high-price setpoint 149 (illustrated with a dashed line) may be set as a default by the electrical power automation application or selected by the consumer. The outside air temperature 154 in the environment around the consumer's home or other building may be obtained from any of a variety of suitable sources, such as a weather forecasting service accessible over a wide area network or an outside temperature sensor communicating directly with the consumer's smart thermostat or smart device. The maximum (high) inside air temperature setpoint or limit 150 and the minimum (low) inside air temperature setpoint or limit 152 may be set as a default by the electricity automation application, but will more typically be selected by the consumer via an electricity automation app running on their smart device. The actual inside air temperature setpoint 158 that is in effect at any particular point in time may be set by the consumer and/or programmed by the consumer to vary according to a schedule. If the consumer has granted authorization to the electricity automation application to control the actual inside air temperature setpoint 158, then the electricity automation application may cause a change in the actual inside air temperature setpoint 158 from time to time for the purpose of reducing the consumer's consumption of electricity during a high-price time interval. The inside air temperature 156 (inside the home or other building) may be measured by the smart thermostat or other connected device and communicated to the electricity automation application as necessary to determine the energy efficiency of the home or building, determine the actual inside air temperature at any point in time, and/or to determine the accuracy of inside air temperature predictions over time. It should be recognized that any control setting of the smart thermostat may be shared with the electricity automation application and that the electricity automation application may, if authorized by the consumer, change any of the control settings of the smart thermostat.

FIG. 7 illustrates a high-price time interval 160 that has a beginning timepoint 162. For purposes of this illustration, the high-price time interval may be assumed to have been identified from price prediction data obtained prior to the 24-hour time period shown in FIG. 7, but the high-price time interval could also have been identified from updated price prediction data obtained at some other time prior to the high-price time interval 160.

In order to determine a first precooling initiation timepoint 164 prior to a beginning of the identified first time interval 160, the operations may predict that the inside air temperature 156 at the beginning of the identified first time interval (timepoint 166) will be the same as the "unadjusted" inside air temperature setpoint 158 just prior to the beginning of the identified first time interval (timepoint 166). In FIG. 7, the solid line 158 illustrates the actual inside air temperature setpoint that the thermostat uses to control the air conditioning system during the 24 hour time period shown. However, the solid line 158 reflects a combination of inside air temperature setpoints programmed or set into the thermostat as well as inside air temperature setpoints that are dynamically received from the electricity automation application in response to high-price time intervals during the day. Accordingly, the solid line 158 rises to the maximum air temperature setpoint 150 during the high-price time interval 168 (i.e., a random price spike), rise to the maximum air temperature setpoint 150 during the high-price time interval 160 (i.e., a predicted high-price), and drops to the minimum air temperature setpoint 152 during the precooling time interval 170. During these three time intervals 168, 170, 160, horizontal or stepped dashed line illustrates the value of the programmed inside air temperature setpoint that would have been used by the thermostat if it were not for the electricity automation application changing the setpoint. Accordingly, for the purpose of determining the first precooling initiation timepoint 164, the inside air temperature 156 at the beginning of the identified first time interval (timepoint 166) is predicted to be (i.e., the inside air temperature would have been) the same as the "unadjusted" inside air temperature setpoint 158 (dashed line) just prior to the beginning of the identified first time interval (timepoint 166). Therefore, the predicted inside air temperature at the beginning of the identified first time interval 160 is the point 172 at the intersection of the dashed line and timepoint 166.

Having predicted the inside air temperature (i.e., point 172) at the beginning of the high-price time interval, the operations then determine a first precooling time period 174 required for the air conditioning system to cool the inside air of the building from the predicted inside air temperature (i.e., point 172) to the minimum inside air temperature setpoint 152. In the illustrated graph, the first precooling time period represents the amount of time required for the given air conditioning system in the given building to cool from about 72 degree F. to about 68 degrees F. Next, the first precooling initiation timepoint may be calculated by subtracting the first precooling time period 174 from the beginning of the identified first time interval (i.e., timepoint 166. However, in the illustration of FIG. 7, a time buffer 176 has been added to the first precooling time period 174 and the sum has been subtracted from the beginning of the identified first time interval (i.e., timepoint 166). The amount of the time buffer 176 may be varied. However, in this illustration, the electricity automation application may cause the inside air temperature setpoint 158 for the thermostat to be set equal to the minimum inside air temperature 152 at the first precooling initiation timepoint 164 such that the air conditioning system would be continuously actively cooling during the first precooling time period 174 and would be intermittently cooling to maintain the air temperature at the minimum air temperature setpoint 152 during the time buffer 176.

During the first precooling time period 174, the air conditioning system is continuously actively cooling and utilizes electricity at a high rate. However, by performing the continuous active cooling prior to the high-price period 160, the cost of that amount of electricity is lower than it would have been if the programmed inside air temperature setpoint had been used throughout the high-price time interval 160. Furthermore, the inside air temperature has been maintained between the minimum air temperature setpoint 152 and the maximum air temperature setpoint 150 (i.e., a predefined comfort range selected by the user or set by default by the automation application). Still further, the use of the time buffer 176 has also enabled a portion of the continuous active cooling of the precooling time interval 174 to occur prior to the marginal increase in electricity price that occurred at timepoint 178 in the runup to the high-price time interval 160. A time buffer 176 of some amount of time helps to assure that the inside air temperature 156 is cooled to the minimum inside air temperature setpoint 152 prior to the beginning of the high-price time interval 160. It should be understood that the identified first time interval 160 is a "predicted" time interval, such that the exact beginning and ending timepoints are merely estimates. The time buffer 176 preferably is larger than the average amount of variability in the beginning timepoint of the high-price time interval 160.

During the high-price time interval 160, the inside air temperature setpoint 158 is set to the maximum inside air temperature setpoint 150 by the automation application. As a result, the thermostat turns of the air conditioning and the inside air temperature 156 is allowed to gradually rise. The rate of the gradual rise in inside air temperature is a function of the outside air temperature and the thermal efficiency of the building. While FIG. 7 illustrates that the inside air temperature does not ever reach the inside air temperature setpoint 158 during the high price time interval 160, this is not always the case. However, even if the thermostat causes the air conditioning system to actively cool the inside air to maintain the inside air temperature 156 at the inside air temperature setpoint 158 (i.e., while it is set to the maximum inside air temperature setpoint 150), the use of electricity during the high-price time interval 160 has been substantially reduced while maintaining the inside air temperature at a comfortable level as defined by the minimum and maximum inside air temperature setpoints 152, 150. At the end of the high-price time interval 160, the automation application may instruct the thermostat to return to its programmed or set inside air temperature setpoint(s). So, in the illustration of FIG. 7, the automation application has taken over control of the thermostat's inside air temperature setpoint during the two periods labeled "Automation", including the time intervals 168 (random price spike), 170 (precooling with time buffer), 160 (high-price time interval). Depending upon the predicted and/or actual electricity prices during the time period, the automation application may take over control for the thermostat (i.e., instruct the thermostat to implement a specific inside air temperature setpoint) any number of times or not at all.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:
    identifying a first time interval during a first time period at which a predicted price for electricity on an electric grid is greater than a high-price setpoint;
    determining, for a thermostat in an air conditioning system for controlling an inside air temperature within a building receiving electricity from the electric grid, a first precooling initiation timepoint prior to a beginning of the identified first time interval by:
        predicting the inside air temperature at the beginning of the identified first time interval;
        determining a first precooling time period required for the air conditioning system to cool the inside air of the building from the predicted inside air temperature to a minimum inside air temperature setpoint; and
        calculating the first precooling initiation timepoint by subtracting the first precooling time period from the beginning of the identified first time interval; and
    causing an inside air temperature setpoint for the thermostat to be set equal to the minimum inside air temperature at the first precooling initiation timepoint.

2. The computer program product of claim 1, the operations further comprising:
    causing the inside air temperature setpoint for the thermostat to be set equal to the maximum inside air temperature at the beginning of the identified first time interval.

3. The computer program product of claim 1, the operations further comprising:
    causing the inside air temperature setpoint for the thermostat to return to a pre-programmed value at the end of the identified first time interval.

4. The computer program product of claim 1, the operations further comprising:
    causing the inside air temperature setpoint for the thermostat to be set equal to the maximum inside air temperature in response to the actual current price of electricity being greater than the high-price setpoint at any point during the first time period; and
    causing the inside air temperature setpoint for the thermostat to return to a pre-programmed value in response to the actual current price of electricity being less than the high-price setpoint and the current time is not between the precooling initiation timepoint and the beginning of the identified first time interval.

5. The computer program product of claim 1, the operations further comprising:
    obtaining, prior to the first time period, a first predicted price for electricity available to the air conditioning system during each of a plurality of time intervals throughout the first time period.

6. The computer program product of claim 5, wherein the inside air temperature setpoint for the thermostat is caused to be set equal to the minimum inside air temperature at the precooling initiation timepoint by sending a message to the thermostat, wherein the message instructs the thermostat to set the inside air temperature setpoint to a value equal to the minimum inside air temperature.

7. The computer program product of claim 6, the operations further comprising:
 queuing the message to the thermostat, wherein the message is sent to the thermostat in response to a current time reaching the precooling initiation timepoint and the message remaining in the queue.

8. The computer program product of claim 5, the operations further comprising:
 obtaining, within a predetermined amount of time prior to a beginning of each of the plurality of time intervals throughout the first time period, an updated predicted price for electricity available to the air conditioning system during the time interval; and
 removing the message from the queue in response to the updated price for electrical power during the identified first time interval being less than the high-price setpoint for the thermostat.

9. The computer program product of claim 5, the operations further comprising:
 obtaining, within a predetermined amount of time prior to a beginning of each of the plurality of time intervals throughout the first time period, an updated predicted price for electrical power available to the air conditioning system during the time interval; and
 leaving the message in the queue in response to the updated price for electrical power during the identified first time interval being greater than the high-price setpoint for the thermostat.

10. The computer program product of claim 5, the operations further comprising:
 obtaining, within a predetermined amount of time prior to a beginning of each of the plurality of time intervals throughout the first time period, an updated predicted price for electricity available to the air conditioning system during the time interval; and
 identifying a second time interval among the plurality of time intervals during the first time period at which the updated predicted price for electricity is greater than the high-price setpoint for the thermostat, wherein the predicted price for electricity during the second time interval is less than the high-price setpoint for the thermostat;
 determining a second precooling initiation timepoint prior to a beginning of the identified second time interval by:
  predicting the inside air temperature at the beginning of the identified second time interval;
  determining a second precooling time period required for the air conditioning system to cool the inside air of the building from the predicted inside air temperature at the beginning of the identified second time interval to the minimum inside air temperature setpoint; and
  calculating the second precooling initiation timepoint by subtracting the second precooling time period from the beginning of the identified second time interval; and
 causing the inside air temperature setpoint for the thermostat to be set equal to the minimum inside air temperature at the second precooling initiation timepoint.

11. The computer program product of claim 1, wherein the predicted price for electricity available to the air conditioning system at each of the plurality of timepoints through the first time period are obtained from a third-party application server over a wide area network.

12. The computer program product of claim 1, wherein predicting the inside air temperature at the beginning of the identified first time interval includes identifying an inside air temperature setpoint that the thermostat has been set to apply at the beginning of the identified first time interval and predicting that the inside air temperature at the beginning of the identified first time interval will be equal to the inside air temperature setpoint at the beginning of the identified first time interval.

13. The computer program product of claim 1, the operations further comprising:
 adding a time buffer to the calculated first precooling time period before calculating the first precooling initiation timepoint.

14. The computer program product of claim 1, wherein determining a first precooling time period required for the air conditioning system to cool the inside air of the building from the predicted inside air temperature to a minimum inside air temperature setpoint includes:
 calculating a temperature differential between a forecast outside air temperature for a location of the building at the beginning of the identified first time interval and the predicted inside air temperature at the beginning of the identified first time interval;
 obtaining a predetermined rate of decrease of the inside air temperature of the building with the air conditioning system turned on for cooling the air inside the building, wherein the predetermined rate of decrease of the inside air temperature is stored as a function of the temperature differential;
 calculating a precooling temperature change as the difference between the predicted inside air temperature at the beginning of the identified first time interval and the minimum inside air temperature setpoint; and
 calculating the first precooling time period as the precooling temperature change divided by the predetermined rate of decrease of the inside air temperature that is associated with the calculated temperature differential.

15. The computer program product of claim 14, the operations further comprising:
 determining, for each of a plurality of increments in a temperature differential value between an inside air temperature of the building and an outside air temperature near the building, a rate of decrease of the inside air temperature of the building with the air conditioning system actively cooling the inside air;
 storing, for each of the plurality of increments in the temperature differential value, the temperature differential value in association with the rate of decrease of the inside air temperature of the building with the air conditioning system actively cooling the inside air determined with the temperature differential value; and
 selecting the predetermined rate of decrease of the inside air temperature as the rate of decrease of the inside air temperature determined for a temperature differential that is the closest to the calculated temperature differential between the forecast outside air temperature for the location of the building at the beginning of the identified first time interval and the predicted inside air temperature at the beginning of the identified first time interval.

16. The computer program product of claim 6, wherein the operation of determining, for each of a plurality of increments in a temperature differential value between an inside air temperature of the building and an outside air temperature near the building, a rate of decrease in an inside air temperature of the building with the air conditioning system actively cooling the inside air includes:

periodically obtaining a cooling regain data set with the air conditioning system actively cooling the inside air, each cooling regain data set including a timestamp, the inside air temperature measurement for the building, the outside air temperature measurement at a location near the building;

determining, for each cooling regain data set, a key-value pair including a key and a coefficient value associated with the key, wherein the key is an absolute value of a difference between the inside air temperature measurement and the outside air temperature measurement in the cooling regain data set, and wherein the coefficient value is a rate of change in the inside air temperature measurement between the input data set and a previous input data set over an amount of time between the timestamp for the cooling regain data set and a timestamp for the previous cooling regain data set.

17. The computer program product of claim 16, the operations further comprising:

calculating, for each of a plurality of key-value pairs in the cooling regain data set having the same value of the key, an average of the coefficient values.

18. The computer program product of claim 16, the operations further comprising:

rounding the value of the key to the nearest of a plurality of predetermined key values.

19. The computer program product of claim 18, wherein the plurality of predetermined values form a series of temperature values that differ by half of one degree Fahrenheit.

* * * * *